United States Patent
Hata (10) Patent No.: US 8,031,048 B2
(45) Date of Patent: Oct. 4, 2011

(54) VEHICLE ANTITHEFT SYSTEM AND VEHICLE ANTITHEFT METHOD

(75) Inventor: Toshiaki Hata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1215 days.

(21) Appl. No.: 11/783,170

(22) Filed: Apr. 6, 2007

(65) Prior Publication Data

US 2008/0100417 A1    May 1, 2008

(30) Foreign Application Priority Data

Oct. 30, 2006   (JP) ................. 2006-294461

(51) Int. Cl.
*B60R 25/00* (2006.01)
(52) U.S. Cl. ............... 340/5.72; 340/5.61; 340/5.65
(58) Field of Classification Search ............ 340/10.2, 340/5.6, 5.65, 5.61, 426.13, 426.16; 713/168, 713/169; 307/10.1
See application file for complete search history.

(56) References Cited

U.S. PATENT DOCUMENTS

| 6,617,961 B1* | 9/2003 | Janssen et al. ............. 340/5.8 |
| 6,765,497 B2* | 7/2004 | Ablay et al. .............. 340/905 |
| 7,061,368 B2* | 6/2006 | Okada ..................... 340/5.6 |

FOREIGN PATENT DOCUMENTS

JP    2004-114860 A    4/2004

* cited by examiner

*Primary Examiner* — Vernal Brown
(74) *Attorney, Agent, or Firm* — Sughrue Mion, PLLC (57) ABSTRACT

During traveling a vehicle, an on-vehicle unit control circuit 22 transmits regularly a mobile unit verification encryption code stored in a storage part 23 of an on-vehicle unit 2 to a mobile unit 1; a transmission circuit 10 of the mobile unit 1 replies a response signal to the on-vehicle unit 2 every time the verification code is received; and the control circuit 22 of the on-vehicle unit 2 updates and stores vehicle environmental information in the storage part 23 upon receiving the response signal, and if the on-vehicle unit 2 cannot receive any response signal from the mobile unit 1, a driver is notified with display lamp 53, hazard lamp 54, or alarm buzzer 55 that the response signal has not been received.

9 Claims, 6 Drawing Sheets

VEHICLE ANTITHEFT SYSTEM AND VEHICLE ANTITHEFT METHOD

BACKGROUND OF THE INVENTION

1. Field of the Invention

The present invention relates to an antitheft system of vehicles propelled by an internal combustion engine such as motorcycles and, more specifically, to an electronic key system (in other words, a vehicle antitheft system) in which verification of ID codes is made between a transmitter-receiver that a user carries and a control device mounted on a vehicle, whereby the internal combustion engine is allowed to start only in the case of being the start request from an allowable user.

2. Description of the Related Art

For example, in one of the conventional vehicle antitheft systems, verification of respective stored ID codes is made between a transmitter-receiver (mobile unit) that a driver carries and a transmitter-receiver on the vehicle side; and as a result of verification, in case of coincidence of both ID codes, an engine of the vehicle is allowed to start.

Furthermore, in the case of two-wheel vehicles as compared with four-wheel vehicles, there is a high possibility that a mobile unit is missed during traveling due to any accident. In the case where the mobile unit is missed, it is necessary to notify a driver of being missed.

As a system of warning when a driver drops a mobile unit, there is a vehicle electronic key system as disclosed in, for example, the Japanese Patent Publication (unexamined) No. 114860/2004.

This Japanese Patent Publication (unexamined) No. 114860/2004 discloses "a vehicle electronic key system having a control device mounted on an actual vehicle and a mobile transmitter-receiver transmitting a response signal based on receiving a request signal from this control device, the control device including first means for outputting the request signal with respect to a mobile transmitter-receiver based on ON operation of a start switch of the actual vehicle, second means for detecting a response signal from the mobile transmitter-receiver based on the request signal, and third means for making a warning output in the case where no response signal is detected at the second means irrespective of output of the request signal from the first means".

Further, according to this vehicle electronic key system, it is described that "first, in the case where a user makes a start switch ON without noticing that he carries no mobile transmitter-receiver, or has dropped it, since no response signal is detected at the second means irrespective of output of the request signal from the first means, an alert warning will be outputted through the third means, and thus the user will notice that he carries no mobile transmitter-receiver.

In this manner, the Japanese Patent Publication (unexamined) No. 114860/2004 discloses an electronic key system in which in the case where a user drops a mobile unit during the vehicle being stopped as well as during traveling, this fact can be outputted as an alert warning, thus enabling to make it less frequent to the utmost for a user to miss a mobile unit.

In the above-mentioned vehicle antitheft system (vehicle electronic key system), there may be advantages of vehicle antitheft of four-wheel vehicles driven in a room (driver's cab) of the vehicles that is separated from outside.

However, in the case of two-wheel special vehicles ("two-wheel vehicles" are referred to as auto-bikes, and "special vehicles" are referred to as outboard marine engines, buggy cars, snowmobiles, water-bikes and the like) in which a driver is directly provided with sounds of vehicles themselves (engine sounds), whistles during traveling, extraneous sounds or the like, since they are not vehicles driven in a room separated from outside as are four-wheel vehicles, there are some cases where a driver does not notice that a key is dropped even when his vehicle begins to move.

In addition, even if notification is made with, e.g., lamps, there is the possibility that such warning is missed to notice due to reflection from a meter panel under sunlight.

A further problem exits in that when a driver once stops an engine, moves away without noticing loss of an electronic key, and then returns to his vehicle again and tries to restart the engine, he notices the loss of an electronic key for the first time, and thus cannot make the engine ON.

SUMMARY OF THE INVENTION

The present invention was made to solve the problems as discussed above, and has an object of providing a vehicle antitheft system or a vehicle antitheft method in which, in the case where a driver misses a mobile unit at the time of start, traveling, being stopped or the like of vehicles, the driver immediately is notified (for example, notified with an illuminated lamp) of the fact (that is, the mobile unit is missed); as well as a transmitter-receiver on the vehicle side is made to store vehicle environmental information for specifying the location of the mobile unit being missed to display the information (for example, to display the location of being missed with a digital meter), whereby it is possible to prevent the eventual loss of the mobile unit, and furthermore it is possible to easily specify the position of the mobile unit being missed.

A vehicle antitheft system according to the present invention, in which verification of encryption codes is made between a mobile unit that a driver carries and an on-vehicle unit that is mounted on a vehicle, and when the encryption codes for verification are coincident, the mentioned on-vehicle unit permits the vehicle to move, the vehicle antitheft system including:

mobile unit verification encryption code transmission means for causing a mobile unit verification encryption code having preliminarily been stored in a storage part of the mentioned on-vehicle unit to be transmitted to the mentioned mobile unit by operation of the mentioned driver;

determination means of the mentioned mobile unit for determining whether or not the mentioned mobile unit verification encryption code having been received is the one that is transmitted from his own vehicle;

reply means of the mentioned mobile unit for replying a response signal corresponding to the mentioned mobile unit verification encryption code to the mentioned on-vehicle unit when the mobile unit verification encryption code that the mentioned determination means has received is determined to be transmitted from his own vehicle; and on-vehicle unit control means for outputting a control signal permitting the vehicle to move in the case where the mentioned response signal having been replied corresponds to the mentioned mobile unit verification encryption code.

Furthermore, in this antitheft system, during traveling of the vehicle, the mentioned on-vehicle unit control means transmits at regular intervals the mentioned mobile unit verification encryption code that is stored in the storage part of the mentioned on-vehicle unit to the mentioned mobile unit; reply means of the mentioned mobile unit replies the mentioned response signal to the mentioned on-vehicle unit every time when the mentioned mobile unit verification encryption code is received; and control means of the mentioned on-vehicle unit updates and stores vehicle environmental information in the storage part of the mentioned on-vehicle unit every time when the mentioned on-vehicle unit receives the mentioned response signal, and, in the case where the mentioned on-vehicle unit cannot receive the mentioned response signal from the mentioned mobile unit, the notification means notifies the driver that the response signal has not been received.

As a result, according to this vehicle antitheft system of the invention, the control means of the on-vehicle unit updates and stores the vehicle environmental information in the storage part of the on-vehicle unit every time when the on-vehicle unit receives a response signal, and in the case where the on-vehicle unit cannot receive any response signal from the mobile unit, the notification means notifies the driver that any response signal has not been received. Consequently, it is possible for the driver to surely know that the mobile unit is missed, thus it is possible to prevent the mobile unit from being missed.

Furthermore, a vehicle antitheft method according to the invention, in which verification of encryption codes is made between a mobile unit that a driver carries and an on-vehicle unit that is mounted on a vehicle; and when the encryption codes for verification are coincident, the mentioned on-vehicle unit permits the vehicle to move, the vehicle antitheft method including:

a mobile unit verification encryption code transmission step for causing a mobile unit verification encryption code having preliminarily been stored in the storage part of the mentioned on-vehicle unit to be transmitted to the mentioned mobile unit by operation of the mentioned driver;

a determination step of the mentioned mobile unit for determining whether or not the mentioned mobile unit verification encryption code having been received is the one that is transmitted from his own vehicle;

a reply step of the mentioned mobile unit for replying a response signal corresponding to the mentioned mobile unit verification encryption code to the mentioned on-vehicle unit when the mobile unit verification encryption code received in the mentioned determination step is determined to be transmitted from his own vehicle; and an on-vehicle unit control step for outputting a control signal permitting the vehicle to move in the case where the mentioned response signal having been replied corresponds to the mentioned mobile unit verification encryption code.

Further, in this antitheft method, during traveling of the vehicle, the mentioned mobile unit verification encryption code that is stored in the storage part of the mentioned on-vehicle unit is transmitted to the mentioned mobile unit at regular intervals; in the reply step of the mentioned mobile unit, the mentioned response signal is replied to the mentioned on-vehicle unit every time when the mentioned mobile unit verification encryption code is received; vehicle environmental information is updated and stored in the storage part of the mentioned on-vehicle unit every time when the mentioned on-vehicle unit receives the mentioned response signal; and in the case where the mentioned on-vehicle unit cannot receive any response signal from the mentioned mobile unit, the driver is notified that the response signal has not been received.

As a result, according to this vehicle antitheft method of the invention, during traveling of the vehicle, the mobile unit verification encryption code that is stored in the storage part of the on-vehicle unit is transmitted to the mobile unit at regular intervals; a response signal is replied to the on-vehicle unit every time when the mobile unit verification encryption code is received; vehicle environmental information is updated and stored in the storage part of the on-vehicle unit every time when the on-vehicle unit receives the response signal; and in the case where the on-vehicle unit cannot receive any response signal, the driver is notified that any response signal has not been received. Consequently, it is possible for the driver to surely know that the mobile unit is missed, thus it is possible to prevent the mobile unit from being missed.

The foregoing and other objects, features, aspects and advantages of the present invention will become more apparent from the following detailed description of the present invention when taken in conjunction with the accompanying drawings.

DETAILED DESCRIPTION OF THE INVENTION

Embodiment 1

Now, referring to the drawings, a preferred embodiment of the present invention is hereinafter described.

Additionally, throughout the drawings, the same reference numerals indicate the same or like parts.

Figure 1:
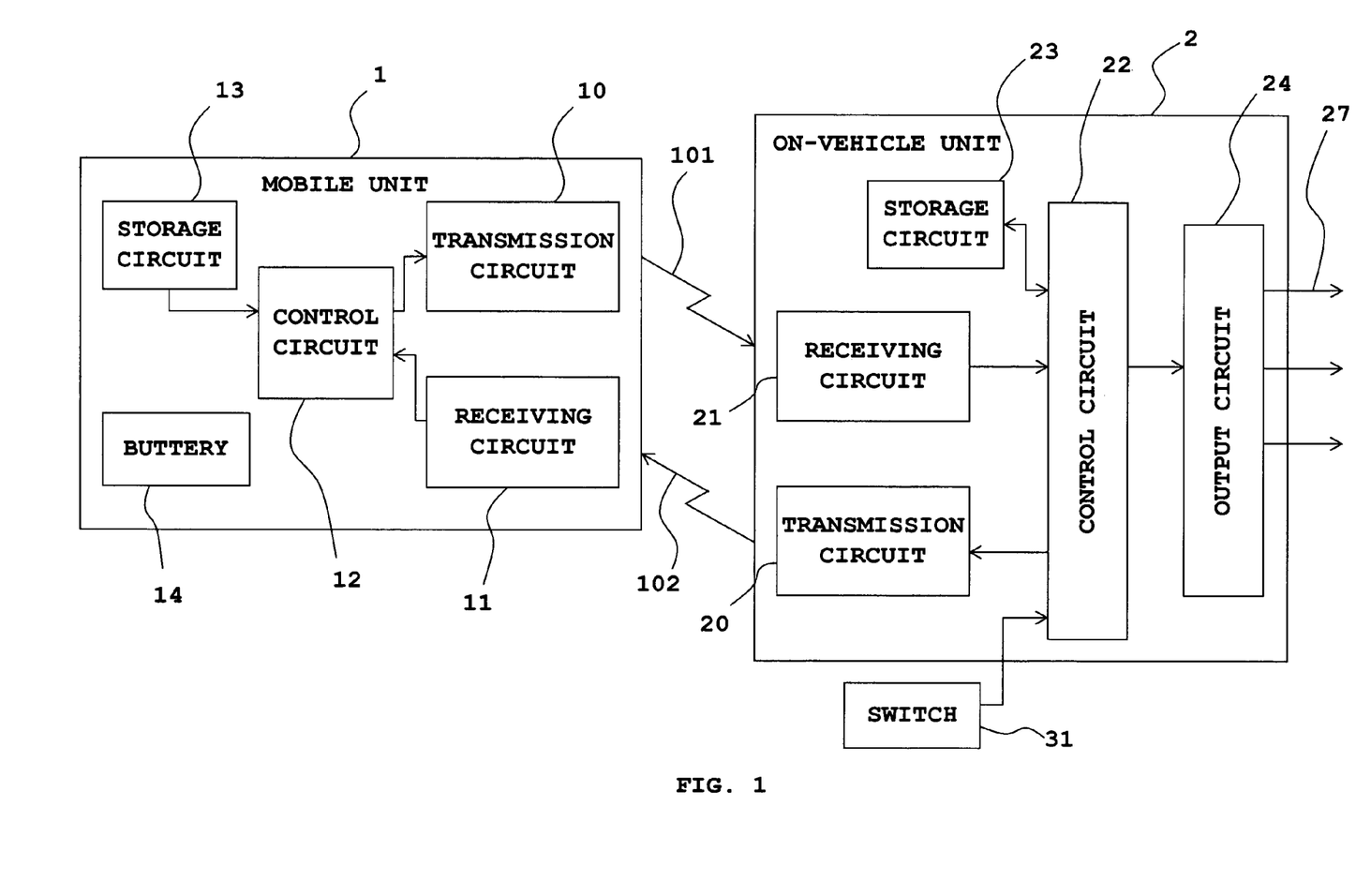
FIG. 1 is a block diagram showing the entire arrangement of a vehicle antitheft system according to a first preferred embodiment of the present invention.
Figure 2:
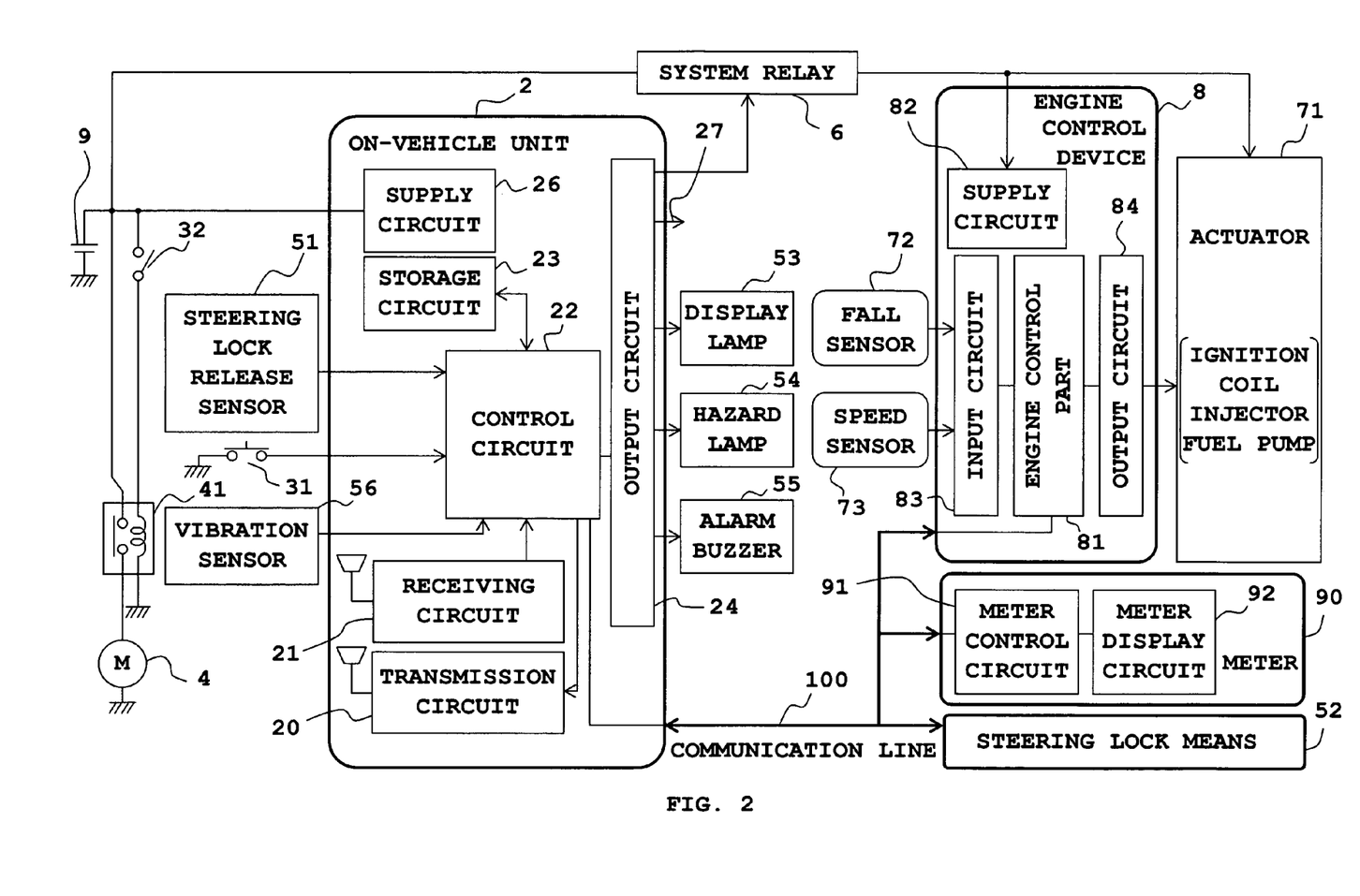
FIG. 2 is a block diagram showing an arrangement of principal parts of an engine control system of a vehicle to which the vehicle antitheft system according to the first embodiment is applied.

FIG. 1 is a block diagram showing the entire arrangement of a vehicle antitheft system according to the first embodiment of the invention. FIG. 2 is a block diagram showing an arrangement of essential parts of an engine control system of vehicles (for example, motorcycles) to which a vehicle antitheft system according to this first embodiment is applied.

Furthermore, in this first embodiment, for example, an example in which a vehicle antitheft system according to the invention is applied to a motorcycle is described. That is, in this example, the vehicle is a motorcycle.

As shown in FIG. 1, a vehicle antitheft system according to the first embodiment is formed of a mobile unit 1 and an on-vehicle unit 2.

The mobile unit 1 is formed of a transmission circuit 10, a receiving circuit 11, a control circuit 12, a storage circuit 13 in which an encryption code (ID code) is stored, and a battery 14 acting as a power supply.

On the other hand, the on-vehicle unit 2 is formed of a transmission circuit 20, a receiving circuit 21, a control circuit 22, a storage circuit 23 in which codes for verification are stored, and an output circuit 24.

Thus, for example, by operation of a switch (button) 31 located at a handle part of a door, communication is started between the mobile unit 1 and the on-vehicle unit 2 to make verification of ID.

In case where the verification of ID is OK (that is, in the case in which the normal communication is made between the mobile unit 1 and the on-vehicle unit 2), the control circuit 22 of the on-vehicle unit 2 outputs output signals 27 via the output circuit 24.

The output signals 27 are drive output signals of a system relay 6, a display lamp 53, a hazard lamp 54, and an alarm buzzer 55 and the like as described below.

FIG. 2 is a block diagram showing an arrangement of the essential parts of an engine control system of the vehicle to which the vehicle antitheft system according to the first embodiment is applied, and shows detailed arrangement of an on-vehicle unit 2, an engine control device 8, a meter 90, and the like.

As shown in FIG. 2, the on-vehicle unit 2 is formed of a transmission circuit 20, a receiving circuit 21, a control circuit 22, a storage circuit in which codes for verification are stored, an output circuit 24, a starter relay 41 supplying a power of the battery 9 to a starter 4, and a power supply circuit 26.

The engine control device 8 is formed of a power supply circuit 82, an engine control part, an input circuit 83, and an output circuit 84.

The meter 90 is formed of a meter control circuit 91, and a meter display circuit 92.

Steering lock means 52 is constructed to cause a steering lock to be locked or unlocked.

In addition, lock or unlock operation of a steering is dangerous in case of any electrical malfunction, so that lock or unlock operation is made manually.

Now, operations of each circuit of the mobile unit 1 and the on-vehicle unit 2 are described.

First, when a user operates the switch 31, then as shown with a reference numeral 102 in FIG. 1, a trigger signal for encryption verification from the on-vehicle unit 2 is radio-transmitted to the mobile unit 1 via the transmission circuit 20.

In the case where the user having the mobile unit 1 is present within the transmission rang of this trigger signal, the receiving circuit 11 of the mobile unit 1 receives this signal.

The control circuit 12 of the mobile unit 1 determines based on this received signal whether or not any encryption code is to be transmitted.

The mobile unit 1 determines from which vehicle the received ID code (that is, the encryption code) is transmitted, thereby responding only to the ID code having been transmitted from his own vehicle.

In the mobile unit 1, when the received encryption code (ID code) is determined to be the one that is transmitted from his own vehicle, the control circuit 12 fetches an encryption code from the storage circuit 13, to be radio-transmitted via the transmission circuit 10 as shown with a reference numeral 101 in FIG. 1.

That is, in the communication between the mobile unit 1 and the on-vehicle unit 2, first by the switch 31 being pressed by a user, the on-vehicle unit 2 transmits an encryption code (ID (1) code) by which determination is made on whether or not it is his own vehicle.

Then, the mobile unit 1 receives this ID (1) code to determine that it is his own vehicle, and transmits an encryption code (ID (2) code) specific to the mobile unit 1.

Subsequently, the battery 14 is a power supply for causing each part of the mobile unit 1 to operate, and keeps a standby state of receiving signals, from the end of transmission until receiving the next signal, in a low-consumption mode so as not to consume a power supply.

In addition, since the mobile unit 1 is activated, and brought in operation so as to be capable of supplied with a power source in response to signals that the receiving circuit 11 receives, the mobile unit 1 is of energy saving type capable of suppressing consumption of the battery 14.

The on-vehicle unit 2 receives the encryption code having been transmitted from the mobile unit 1 via the receiving circuit 21, the control circuit 22 of the on-vehicle unit 2 fetches out an encryption code stored in the storage circuit 23, and verification is made between the encryption code transmitted form the mobile unit 1 and the encryption code stored in the storage circuit 23.

As a result of verification, in the case where the encryption codes are coincident, for example, supposing that a steering is in a locked state, a control signal causing the steering to unlock is outputted from the control circuit 22 to steering lock means 52 via a communication line 100.

Subsequently, when the user operates the switch 31 again, as mentioned above, the on-vehicle unit 2 makes verification of ID codes (encryption codes). As a result of verification, in the case where the encryption codes are coincident, the on-vehicle unit 2 causes the system relay 6 to be ON with output signals from the output circuit 24, and causes the engine control device 8 to start.

At this time, likewise an actuator 71 such as an ignition coil, injector, and fuel pump is also supplied with a power source via the system relay 6.

The on-vehicle unit 2 makes an output of engine start permission to the engine control device 8 from the control circuit 22 via the communication line 100.

Additionally, in the case where the encryption codes are non-coincident, the system relay 6 is not made ON.

Before the engine start permission is outputted, the on-vehicle unit 2 and the engine control device 8 into which common data specific to the vehicle are integrated make giving and receiving of the common data, comparison of those common data is also made at the on-vehicle unit 2, and the engine start permission is outputted upon coincidence of data.

On the contrary, in the case where data (that is, encryption codes) to be given and received between the on-vehicle unit 2 and the engine control device 8 are not coincident, no engine start permission is output, and the system relay 6 will be interrupted after a predetermined time period has passed.

In addition, there is a common code referred to as ID (1) between the mobile unit 1 and the on-vehicle unit 2, there is a code specific to the mobile unit 1 referred to as ID (2), and there is a common code referred to as ID (3) common between the on-vehicle unit 2 and the engine control device 8.

The above-mentioned "common data specific to the vehicle" is ID (3) common between the on-vehicle unit 2 and the engine control device 8.

Moreover, to the control circuit 22 of an on-vehicle unit 2, a variety of devices are connected including a steering lock release sensor 51 for detecting the release of steering lock; a vibration sensor 56 that detects the vibration of vehicle in the state that the engine is not permitted to operate thereby sensing occurrence of theft; a display lamp 53 that, via an output circuit 24, displays release error of steering lock, displays start error of the engine control device 8, or makes warning at the time of theft; a hazard lamp 54 that makes display as an answer back in the case where the result of verification is coincidence, or that illuminates to make warning at the time of occurrence of theft; an alarm buzzer 55 that alarms with sounds at the time of occurrence of theft; and a sound-generating device (not shown).

Furthermore, to the engine control device 8, various sensors (not shown) are connected including those for detecting intake air temperatures, water temperature, air intakes and the like necessary for engine control, fall sensor 72 for detecting fall of vehicle, a vehicle speed sensor 73 for detecting speed of vehicle and calculating an accumulated mileage for a meter.

Signals to be inputted from these sensors are inputted to the engine control part 81 via the input circuit 83.

The engine control part 81 of the engine control device 8 operates the actuator 71 such as ignition coil, injector, fuel pump, etc. via the output circuit 84 based on signals from each of the sensors indicating operation state of the engine to make control for no permission of engine operation.

That is, the engine control part 81 includes engine operation control means.

Further, the power supply circuit 82 supplies voltage from the battery 9 to this engine control part 81.

Summarizing the above-described operations, when a driver (user) makes the switch 31 ON, as indicted by the reference numeral 102 in FIG. 1, a trigger signal for encryption code verification is radio-transmitted from the on-vehicle unit 2 via the transmission circuit 20.

On condition that the user having the mobile unit 1 is present within a transmission rang of this trigger signal, the receiving circuit 11 of the mobile unit 1 receives the signal.

The control circuit 12 of the mobile unit 1 determines based on this received signal whether or not an encryption code is transmitted.

That is, the mobile unit 1 determines from which vehicle the transmitted ID code (encryption code) is transmitted, thereby responding only to the ID code (encryption code) having been transmitted from his own vehicle.

When it is determined that the code is transmitted from his own vehicle, an encryption code is fetched out from the storage circuit 13 by means of the control circuit 12, to be radio-transmitted via the transmission circuit 10.

The on-vehicle unit 2 receives this encryption code via the receiving circuit 21, and the control circuit 22 fetches an encryption code stored in the storage circuit 23 and makes verification.

As the result of verification, in the case where the encryption codes are coincident, steering lock means 52 drives, e.g., electromagnetic solenoid that is contained therein, and releases steering lock by control of the control circuit 22.

Now, operations from the release of steering lock by the driver until the start of an engine, that is, operations from the lock release mode, through the start mode, and leading to the engine operation permission, are described.

Figure 3:
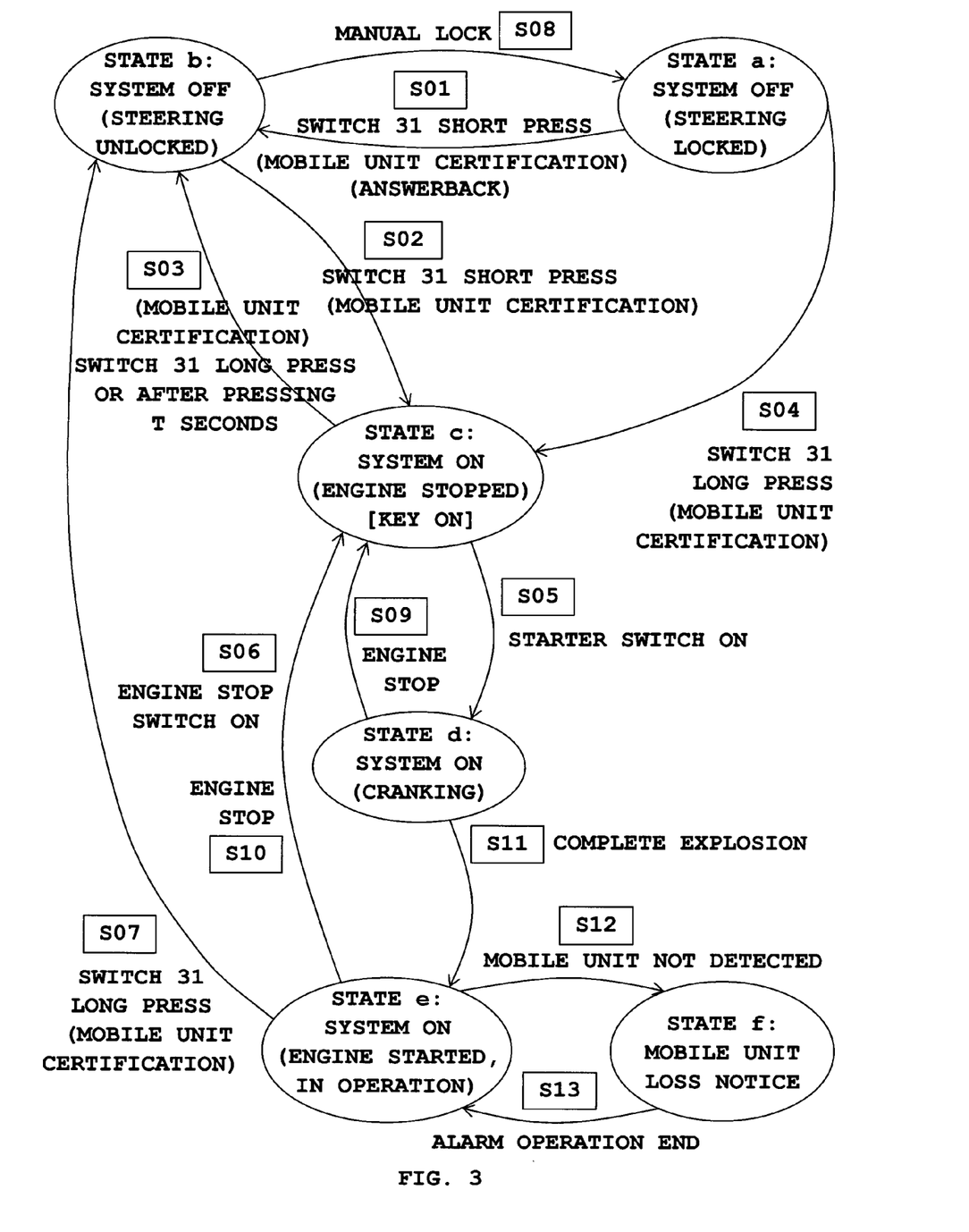
FIG. 3 is a state transition diagram for explaining operations of the vehicle antitheft system according to the first embodiment.

FIG. 3 is a state transition diagram for explaining operations of the vehicle antitheft system according to this first embodiment.

With reference to FIG. 3, the operations of the vehicle antitheft system according to the first embodiment are hereinafter described.

First, the initial state (during locking of steering lock) of the system is in "system OFF state" (State a).

Under this state, by pressing a switch 31 [S01] for a short time period (short press), an on-vehicle unit 2 compares an encryption code that is transmitted from a mobile unit 1 and an encryption code for verification that is stored in the storage circuit 23, and releases steering lock in the case of coincidence. (State b)

Note that even in "State b", the system is in OFF state.

In the case where encryption codes are not in coincidence, the current mode (that is, State a) continues.

In addition, when the switch 31 is pressed for a short time period [S02], the on-vehicle unit 2 compares again an encryption code that is transmitted from a mobile unit 1 and an encryption code for verification that is stored in the storage circuit 23. In the case of coincidence, the on-vehicle unit 2 causes the system relay 6 (refer to FIG. 2) to start, and thus system comes to be in ON state (however, an engine is stopped) (State c).

At this time, when the engine control device 8 is started, simultaneously the on-vehicle unit 2 provides an engine start permission to the engine control device 8 via a communication line 100, to bring the actuator 71 such as ignition coil, injector, fuel pump and the like in a start-permitted state.

Additionally, in the case of intending to make system OFF in this state (that is, State c), by pressing the switch 31 for a long time period [S03] (long press), the system is to return to "State b" (system OFF).

Furthermore, in the state of being left in "State c" (system ON), after a predetermined time period (for example, 30 seconds) has passed, the on-vehicle unit 2 stops driving of the system relay 6, to bring the mode of system in "State b (system OFF)".

By making a starter switch 32 (refer to FIG. 2) ON [S05] in "State c" (system ON), cranking is started (State d: system ON), and through complete explosion [S11], the engine can be started (State e: system ON).

Detection of mobile unit is made at regular intervals during the system being ON. In the case where no mobile unit is detected [S12], mobile unit loss notification is made (State f).

When the mobile unit is detected, notification is made to end [S13].

Further, when intending to stop an engine during rotation, the engine stop can be achieved by making an engine-stop switch ON [S06].

This switch is the so-called emergency stop switch. In the case where the engine is stopped during rotation, by pressing the switch 31 for a long time period, program goes to "State b" (system OFF).

The program is transited from State b (system OFF) to State a (system OFF) by manually causing a steering to lock [S08].

In addition, when intending to go all at once form State a (system OFF) to State c (system ON), that is, when intending to cause the engine to start at once, by pressing the switch 31 for a long time period [S04], the release of steering lock and system ON can be made in a substantially simultaneous manner.

At this time, the on-vehicle unit 2 makes comparison of encryption codes with the mobile unit 1 just once, thus achieving the reduction of time period.

Figure 4:
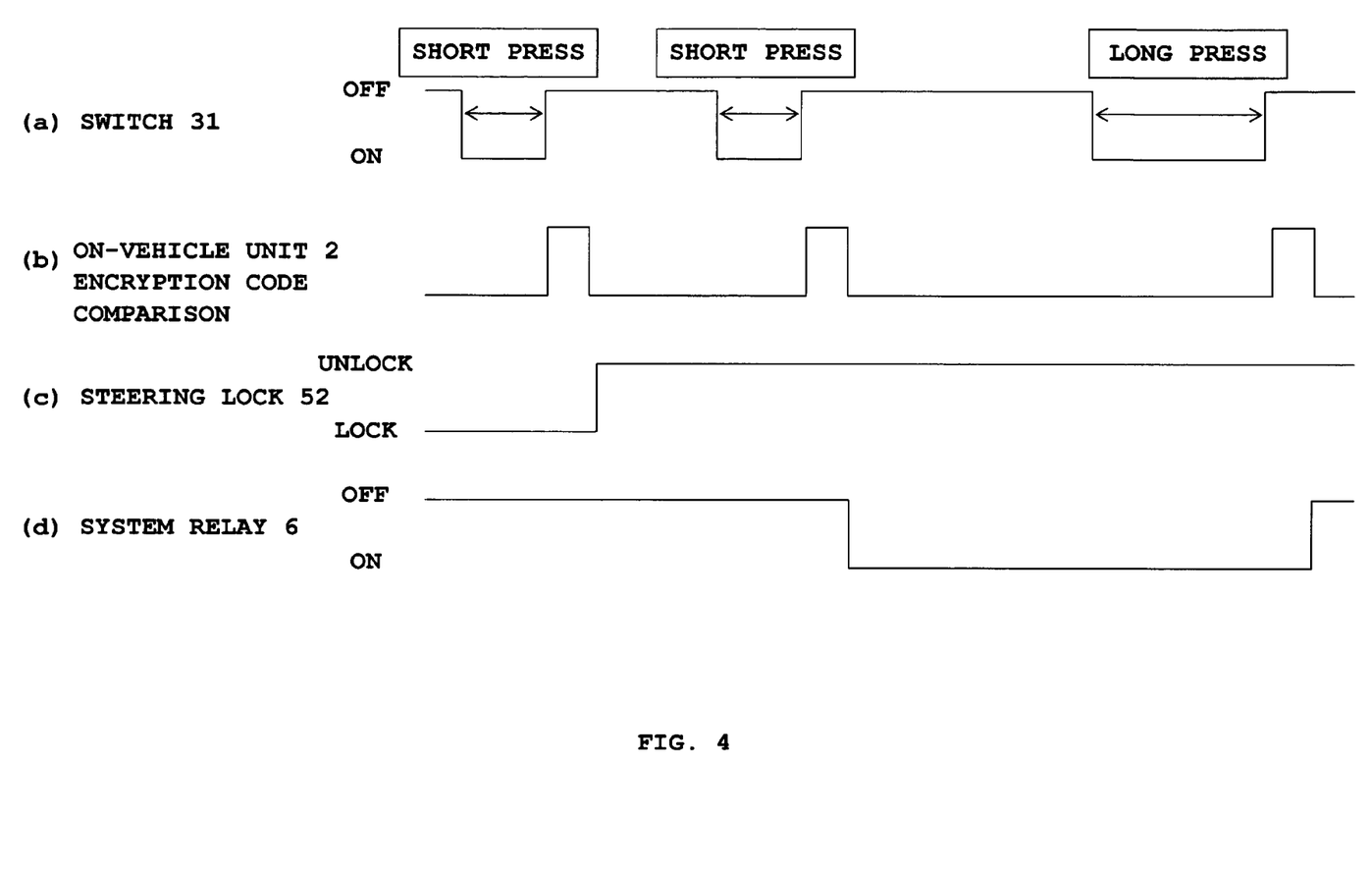
FIG. 4 is a timing chart for explaining operations of the vehicle antitheft system according to the first embodiment.

FIG. 4 is a timing chart for explaining operations of the vehicle antitheft system according to the first embodiment.

FIG. 4 shows encryption code comparison at the on-vehicle unit 2, unlock or lock states of the steering lock means 52, and operational states of the system relay 6 when the switch 31 is operated in sequence by "pressing for a short time period.

Specifically, FIG. 4(*a*) shows ON/OFF operation timing of the switch 31, FIG. 4(*b*) shows timing of encryption code comparison at the on-vehicle unit 2, FIG. 4(*c*) shows operational timing of the steering lock means 52, and FIG. 4(*d*) shows ON/OFF operational timing of the system relay 6.

As shown in FIG. 4, first the switch 31 is "pressed for a short time period" to be brought in ON, and thereafter encryption code comparison is made at the on-vehicle unit 2. In the case of coincidence of encryption codes, the release of steering lock is made.

Subsequently, after the second "press for a short time period", encryption code comparison is made at the on-vehicle unit 2. In the case of coincidence of encryption codes, the system relay 6 is started. By "pressing for a long time period" of the switch 31 after the system relay has been started, the system relay 6 is brought in OFF after encryption code comparison.

Figure 5:
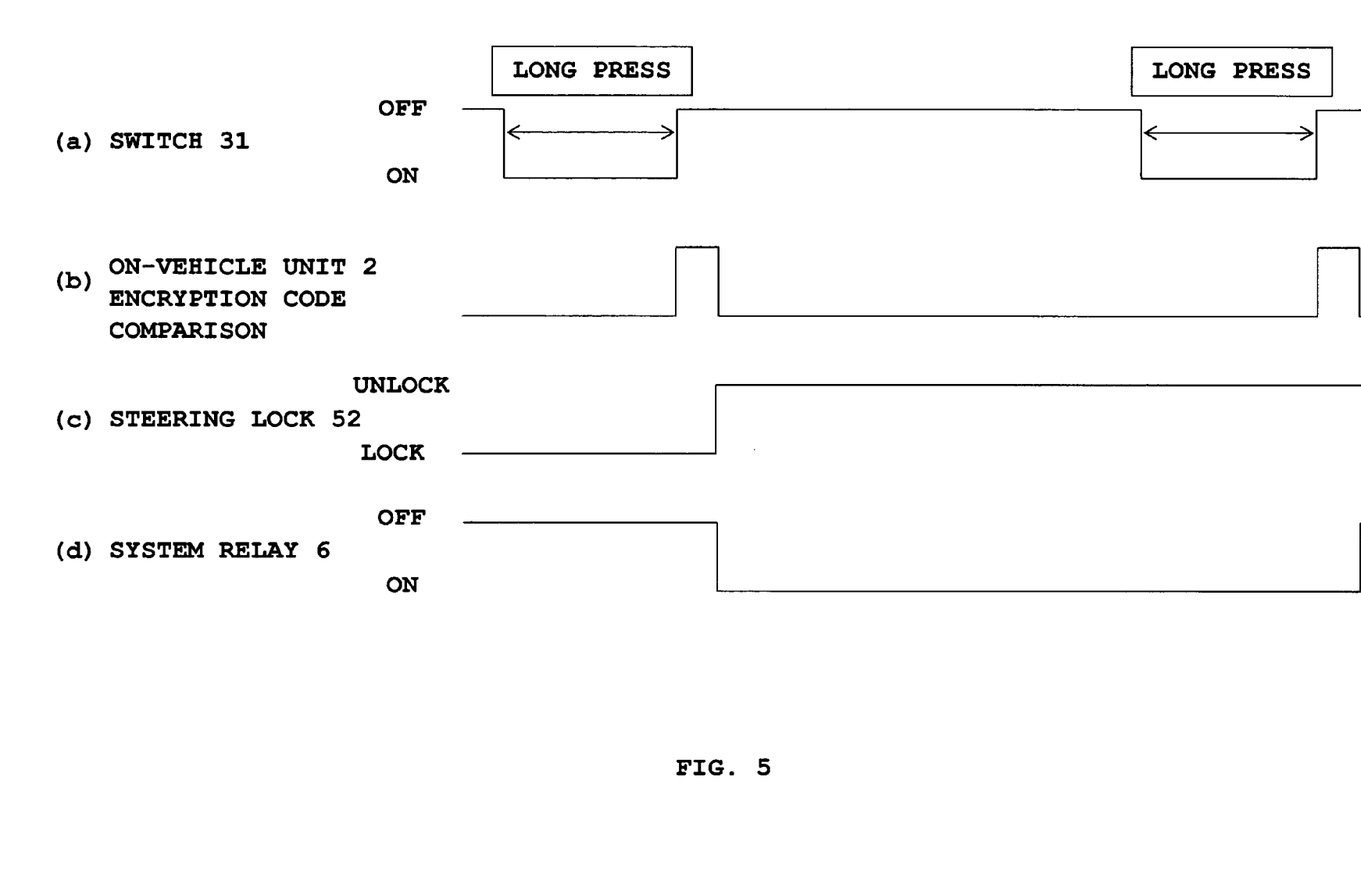
FIG. 5 is a timing chart showing states in which the release of steering lock and the start of a system relay are made in a substantially simultaneous manner in the vehicle antitheft system according to the first embodiment.

FIG. 5 is a timing chart showing states when the switch 31 is "pressed for a long time period" to make steering lock release and start of the system relay 6 in a substantially simultaneous manner.

In this case, encryption code comparison at the on-vehicle unit 2 is made just once, to achieve the reduction of time period for going to a start mode.

Figure 6:
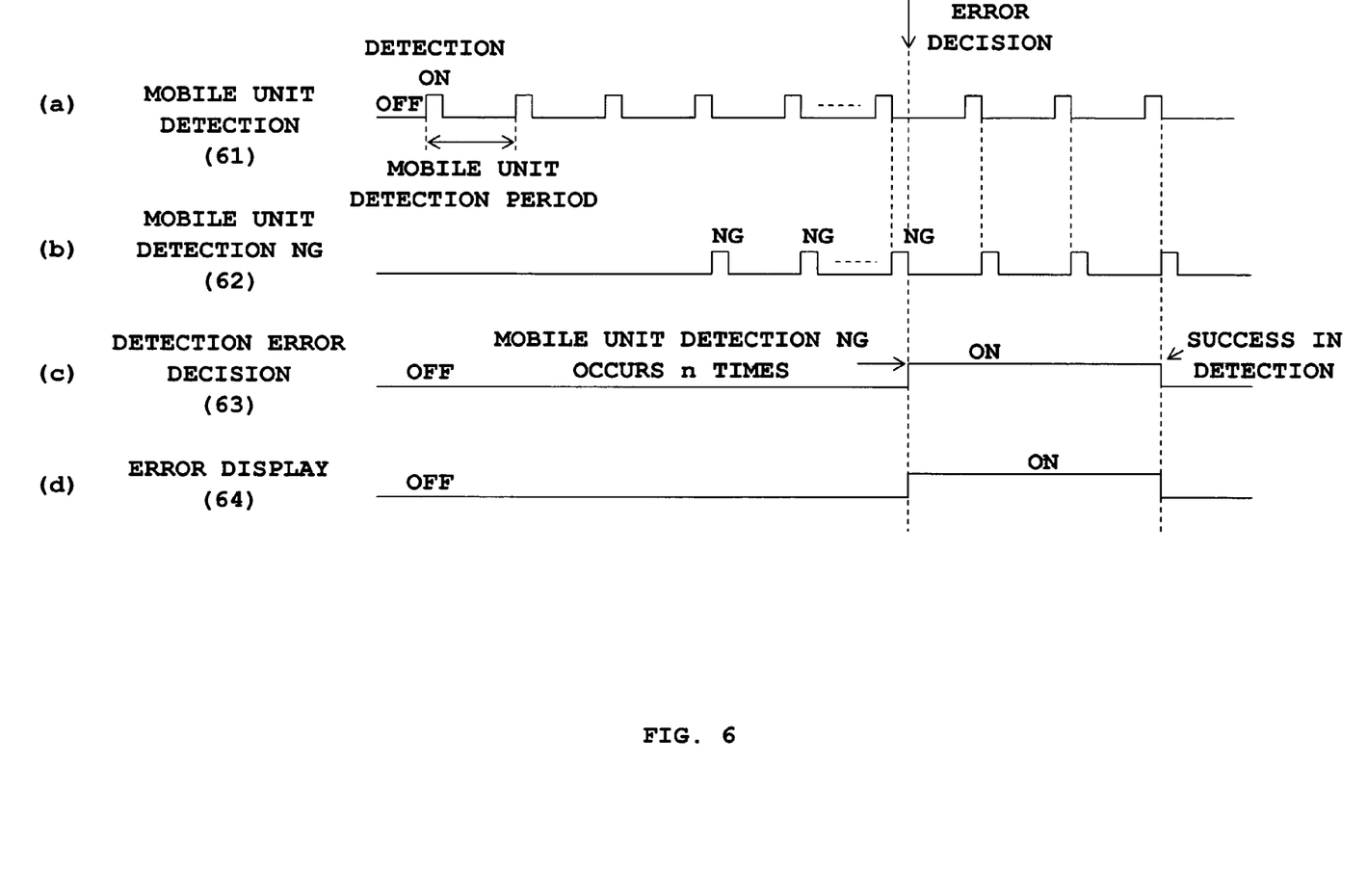
FIG. 6 is a timing chart for explaining detection operations of a mobile unit in the vehicle antitheft system according to the first embodiment.

FIG. 6 is a timing chart for explaining detection operations of the mobile unit 1 in the vehicle antitheft system according to this first embodiment.

That is, FIG. 6 is a timing chart showing operations at the time of detecting whether or not the mobile unit 1 is present near the vehicle after the system has been ON.

Specifically, FIG. 6(*a*) shows timing of mobile unit detection signals having been replied from the mobile unit 1 with trigger signals transmitted from the on-vehicle unit 2.

In the case where no mobile unit detection can be made (that is, in the case where detection of the mobile unit is NG), the control circuit 22 of the on-vehicle unit 2 makes determination of detection error, and outputs mobile unit detection NG signals as shown in timing 62 of mobile unit detection NG of FIG. 6(*b*).

When the mobile unit detection NG continuously occurs n times, the control circuit 22 decides detection error with ON at timing 63 of detection error decision as shown in FIG. 6(*c*).

At the same time, the on-vehicle unit 2 notifies the display lamp 53 of detection error display as indicated by timing 64 shown in FIG. 6(*d*). (That is, by lighting a meter indicator, the user is notified of the absence of mobile unit.)

At this time, at the time point of the signal being ON in timing 63 of detection error decision, the on-vehicle unit 2 requests vehicle environmental information (herein, mileage data) with respect to a meter 90.

The meter 90 transmits calculated data (for example, an accumulated mileage data that is calculated with velocity at vehicle speed pulses) to the on-vehicle unit 2 via tea communication line 100. Further, the control circuit 22 of the on-vehicle unit 2 stores vehicle environmental information (herein, a mileage data) having been transmitted in the storage circuit 23.

Detection of mobile unit is made at intervals of a certain time period. In the case where detection of any mobile unit cannot be made continuously a predetermined number of times, it is to be mobile unit detection error.

In the case where detection of mobile unit can be successfully made, even once after mobile unit detection error has been decided, program is restored from error mode.

At this time, the vehicle environmental information having been stored in the storage circuit 23 is cleared.

Additionally, for example, in case of higher vehicle speed, detection period is made shorter; and in case of lower vehicle speed, detection period is made longer. Thus, it is arranged to be capable of being detected within a predetermined distance.

Furthermore, as to positional information of the vehicle, a current traveling position of the user's own vehicle is known with a GPS communication part such as navigation system, the road on which his own vehicle is traveling is specified using a map data, and a display part is made to display pathways.

In the case where the mobile unit 1 is missed, it is possible to cause the vehicle (for example, two-wheel special vehicle) to store positional information (map information) or time information of his own vehicle at the time of the mobile unit being missed, and to output the information to the navigation system again and to cause to display the position of being missed at the display part.

As a result, according to this first embodiment, detection of the mobile unit 1 is made at the time of start of the vehicle, during traveling, and at the time of OFF of a key. When detection of the mobile unit cannot be made, it is possible to specify or estimate the location of the mobile unit 1 being missed by vehicle environmental information (mileage, time, or positional information) being stored, and thus it is possible to discover the mobile unit having been missed, In addition, according to this first embodiment, although the case where the vehicle antitheft system according to the invention is applied to two-wheel vehicles is described, it is possible to apply the invention to any ship to be operated by any internal combustion engine, jet propulsion boat or the like as a matter of course.

As described above, a vehicle antitheft system according the first embodiment, in which verification of encryption codes is made between a mobile unit 1 that a driver carries and an on-vehicle unit 2 that is mounted on a vehicle, and when the encryption codes for verification are coincident, the on-vehicle unit 2 permits the vehicle to move, the vehicle antitheft system comprising:

mobile unit verification encryption code transmission means (switch 31) for causing a mobile unit verification encryption code having preliminarily been stored in a storage part 23 of the on-vehicle unit 2 to be transmitted to the mobile unit 1 by operation of the driver;

determination means (that is included in a control circuit 12) of the mobile unit for determining whether or not the mobile unit verification encryption code having been received is the one that is transmitted from his own vehicle;

reply means of the mobile unit 1 for replying a response signal corresponding to the mobile unit verification encryption code to the on-vehicle unit 2 when the mobile unit verification encryption code that the determination means has received is determined to be transmitted from his own vehicle; and on-vehicle unit control means (control circuit 22) for outputting a control signal permitting the vehicle to move in the case where the response signal having been replied corresponds to the mobile unit verification encryption code.

In this vehicle antitheft system, during traveling of the vehicle, the on-vehicle unit control means (control circuit 22) transmits at regular intervals the mobile unit verification encryption code that is stored in a storage part 23 of the on-vehicle unit 2 to the mobile unit 1; the reply means (transmission circuit 10) of the mobile unit 1 replies the response signal to the on-vehicle unit 2 every time when the mobile unit verification encryption code is received; and the control means (control circuit 22) of the on-vehicle unit 2 updates and stores vehicle environmental information in a storage part 23 of the on-vehicle unit 2 every time when the on-vehicle unit 2 receives the response signal, and, in the case where the on-vehicle unit 2 cannot receive the response signal from the mobile unit 1, the notification means (display lamp 53, hazard lamp 54, alarm buzzer 55 and the like) notifies the driver that the response signal has not been received.

In this manner, according to this vehicle antitheft system of this embodiment, the control means of the on-vehicle unit updates and stores the vehicle environmental information in the storage part of the on-vehicle unit every time when the on-vehicle unit receives a response signal, and in the case where the on-vehicle unit cannot receive any response signal from the mobile unit, the notification means notifies the driver that any response signal has not been received. Consequently, it is possible for the driver to surely know that the mobile unit is missed, thus it is possible to prevent the mobile unit from being missed.

Furthermore, even in the case where the driver misses the mobile unit, it is possible to collect the mobile unit having been missed based on vehicle environmental information stored in the storage part of the on-vehicle unit.

Further, in the vehicle antitheft system according to the first embodiment, vehicle environmental information updated and stored every time when the on-vehicle unit receives a response signal is a mileage of the vehicle, time, or positional information of the vehicle. As a result, it is possible to easily estimate the location where the mobile unit is missed based on these information stored and updated.

Further, in the vehicle antitheft system according to the first embodiment, in the case where the on-vehicle unit cannot receive a response signal from the mobile unit, the control means of the on-vehicle unit notifies the driver with the notification means that any response signal has not been received, and stores vehicle environmental information having been updated and stored last time and vehicle environmental information stored at the present time in the storage part of the on-vehicle unit. As a result, it is possible for the driver to immediately know that the mobile unit is missed.

Furthermore, in the vehicle antitheft system according to the first embodiment, in the case where the on-vehicle unit cannot receive the response signal from the mobile unit, the notification means notifies the driver that it cannot be received, as well as notifies the driver that the mobile unit is missed. As a result, it is possible for the driver to surely know that a mobile unit is missed.

In addition, in the vehicle antitheft system according to the first embodiment, the notification means is a combination of luminous body, letter display, buzzer, sound and the like. As a result, it is possible for the driver to surely know that the mobile unit is missed.

A vehicle antitheft method according to the first embodiment, in which verification of encryption codes is made between a mobile unit that a driver carries and an on-vehicle unit that is mounted on a vehicle, and when encryption codes for verification are coincident, the on-vehicle unit permits the vehicle to move, the vehicle antitheft method including:

a mobile unit verification encryption code transmission step for causing a mobile unit verification encryption code having preliminarily been stored in a storage part of the on-vehicle unit to be transmitted to the mobile unit by operation of the driver;

determination step of the mobile unit for determining whether or not the mobile unit verification encryption code having been received is the one that is transmitted from his own vehicle;

a reply step of the mobile unit for replying a response signal corresponding to the mobile unit verification encryption code to the on-vehicle unit when a mobile unit verification encryption code received in the determination step is determined to be transmitted from his own vehicle; and an on-vehicle unit control step for outputting a control signal permitting the vehicle to move in the case where the response signal having been replied corresponds to the mobile unit verification encryption code.

In this vehicle antitheft method, during traveling of the vehicle, the mobile unit verification encryption code that is stored in a storage part of the on-vehicle unit is transmitted to the mobile unit at regular intervals; in the reply step of the mobile unit, the response signal is replied to the on-vehicle unit every time when the mobile unit verification encryption code is received; vehicle environmental information is updated and stored in the storage part of the on-vehicle unit every time when the on-vehicle unit receives the response signal; and in the case where the on-vehicle unit cannot receive the response signal from the mobile unit, the driver is notified that the response signal has not been received.

As a result, according to the vehicle antitheft method of the first embodiment, it is possible for the driver to surely know that the mobile unit is missed, and it is possible to prevent the mobile unit from being missed.

Furthermore, even in the case where the driver misses the mobile unit, it is possible to collect the mobile unit having been missed based on vehicle environmental information stored in the storage part of the on-vehicle unit.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A vehicle antitheft system in which verification of encryption codes is made between a mobile unit that a driver carries and an on-vehicle unit that is mounted on a vehicle, and when the encryption codes for verification are coincident, said on-vehicle unit permits the vehicle to move, the vehicle antitheft system comprising:

mobile unit verification encryption code transmission means for causing a mobile unit verification encryption code having preliminarily been stored in a storage part of said on-vehicle unit to be transmitted to said mobile unit by operation of said driver;

determination means of said mobile unit for determining whether or not said mobile unit verification encryption code having been received is the one that is transmitted from his own vehicle;

reply means of said mobile unit for replying a response signal corresponding to said mobile unit verification encryption code to said on-vehicle unit when the mobile unit verification encryption code that said determination means has received is determined to be transmitted from his own vehicle; and on-vehicle unit control means for outputting a control signal permitting the vehicle to move in the case where said response signal having been replied corresponds to said mobile unit verification encryption code;

wherein during traveling of the vehicle, said on-vehicle unit control means transmits at regular intervals said mobile unit verification encryption code that is stored in the storage part of said on-vehicle unit to said mobile unit;

said reply means of said mobile unit replies said response signal to said on-vehicle unit every time when said mobile unit verification encryption code is received; and said control means of said on-vehicle unit updates and stores vehicle environmental information in the storage part of said on-vehicle unit every time when said on-vehicle unit receives said response signal, and, in the case where said on-vehicle unit cannot receive said response signal from said mobile unit, the notification means notifies the driver that the response signal has not been received.

2. The vehicle antitheft system according to claim 1, wherein said vehicle environmental information is a mileage of the vehicle, time, or positional information of the vehicle.

3. The vehicle antitheft system according to claim 1, wherein in the case where said on-vehicle unit cannot receive a response signal from said mobile unit, said control means of the on-vehicle unit notifies the driver with said notification means that any response signal has not been received, and stores vehicle environmental information having been updated and stored last time and vehicle environmental information stored at the present time in the storage part of said on-vehicle unit.

4. The vehicle antitheft system according to claim 2, wherein in the case where said on-vehicle unit cannot receive a response signal from said mobile unit, said control means of the on-vehicle unit notifies the driver with said notification means that any response signal has not been received, and stores vehicle environmental information having been updated and stored last time and vehicle environmental information stored at the present time in the storage part of said on-vehicle unit.

5. The vehicle antitheft system according to claim 3, wherein in the case where said on-vehicle unit cannot receive said response signal from said mobile unit, said notification means notifies a driver that it cannot be received, as well as notifies said driver that the mobile unit is missed.

6. The vehicle antitheft system according to claim 4, wherein in the case where said on-vehicle unit cannot receive said response signal from said mobile unit, said notification means notifies a driver that it cannot be received, as well as notifies said driver that the mobile unit is missed.

7. The vehicle antitheft system according to claim 3, wherein said notification means is the combination of a luminous body, letter display, buzzer, sound and the like.

8. The vehicle antitheft system according to claim 4, wherein said notification means is the combination of a luminous body, letter display, buzzer, sound and the like.

9. A vehicle antitheft method in which verification of encryption codes is made between a mobile unit a driver carries and an on-vehicle unit mounted on a vehicle, and when encryption codes for verification are coincident, said on-vehicle unit permits the vehicle to move, the vehicle antitheft system comprising:

a mobile unit verification encryption code transmission step for causing a mobile unit verification encryption code having preliminarily been stored in a storage part of said on-vehicle unit to be transmitted to said mobile unit by operation of said driver;

a determination step of said mobile unit for determining whether or not said mobile unit verification encryption code having been received is the one that is transmitted from his own vehicle;

a reply step of said mobile unit for replying a response signal corresponding to said mobile unit verification encryption code to said on-vehicle unit when a mobile unit verification encryption code received in said determination step is determined to be transmitted from his own vehicle; and an on-vehicle unit control step for outputting a control signal permitting a vehicle to move in the case where said response signal having been replied corresponds to said mobile unit verification encryption code;

wherein during traveling of the vehicle, said mobile unit verification encryption code that is stored in a storage part of said on-vehicle unit is transmitted to said mobile unit at regular intervals;

in the reply step of said mobile unit, said response signal is replied to said on-vehicle unit every time when said mobile unit verification encryption code is received;

the vehicle environmental information is updated and stored in the storage part of said on-vehicle unit every time when said on-vehicle unit receives said response signal; and in the case where said on-vehicle unit cannot receive said response signal from said mobile unit, the driver is notified that the response signal has not been received.

* * * * *